United States Patent

McMurtrie

[15] 3,638,037

[45] Jan. 25, 1972

[54] AUTOMATIC TRACKING FILTER

[72] Inventor: Charles Louis McMurtrie, North Plainfield, N.J.

[73] Assignee: Eastech, Inc., South Plainfield, N.J.

[22] Filed: May 26, 1970

[21] Appl. No.: 40,630

[52] U.S. Cl. .................. 307/233, 307/235, 307/295, 324/78 F, 324/78 Q, 324/81, 328/133, 328/140, 328/167

[51] Int. Cl. ........................................ H03d 13/00

[58] Field of Search ............... 307/233, 235, 295; 328/133, 328/140, 141, 165, 167; 324/78 F, 78 Q, 81; 332/18

[56] References Cited

UNITED STATES PATENTS

| 3,308,389 | 3/1967 | Toman et al. | 328/167 |
|---|---|---|---|
| 3,111,657 | 11/1963 | Bagno | 328/133 X |
| 3,270,213 | 8/1966 | Brault | 307/295 |
| 3,092,736 | 6/1963 | Ernyei | 328/133 X |

Primary Examiner—Stanley T. Krawczewicz
Attorney—Frederick W. Padden

[57] ABSTRACT

An automatic tracking filter for use in conjunction with fluid flowmeters automatically locks onto the largest signal in a given frequency spectrum. The filter comprises a narrow band-pass filter having input and output filter circuits (e.g., a low-pass and a high-pass filter) connected in series. The output of the input filter circuit is combined in a control circuit with the input signal to generate an error signal which is used to tune each of the filter circuits to the input signal. In one embodiment disclosed the filter sections are two-pole active R-C filters in which a field-effect transistor is used as a voltage variable resistor.

19 Claims, 7 Drawing Figures

PATENTED JAN 25 1972

INVENTOR
CHARLES L. MC MURTRIE
BY Frederick W. Padden
ATTORNEY

AUTOMATIC TRACKING FILTER

BACKGROUND OF THE INVENTION

This invention relates to electrical circuits for use in conjunction with fluid-mechanical arrangements and, more particularly, to automatic tracking filters for use in conjunction with fluid flowmeters to lock onto the largest signal in given frequency spectrum.

In recent years the development of flowmetering equipment has progressed to the extent that devices are presently available for generating strong oscillatory motion, free from intermittency, in a fluid flowing in a pipeline or conduit and for converting the oscillation into an electrical signal for measurement of its frequency which is related to the volumetric flowrate. One such flowmeter having a high signal-to-noise ratio is described by myself and A. Rodely in copending application Ser. No. 786,615, now U.S. Pat. No. 3,587,312, filed on Dec. 24, 1968 and assigned to the assignee hereof. This flowmeter includes a bluff body arrangement with differential sensor apparatus mounted on a base surface which faces an incoming fluid flow. As disclosed therein, electrically heated sensors are provided with ceramic materials which isolate heatable grid elements from physical contact with the fluid, and electrical circuitry, including a bridge network, an amplifier, a preemphasis network and a narrow band-pass filter (filter 15, FIG. 2 of that application) is utilized to translate the sensed oscillatory flow signals into indications of flowrate through a pipeline.

The primary function of the band-pass filter is to remove broad band turbulent and electrical noise that accompanies the signal. One problem which has plagued workers skilled in the flowmeter art is the accurate determination, in the presence of turbulent noise, of the signal frequency which is proportional to the fluid flowrate. This problem is compounded by the fact that the flowrate, and hence the signal frequency, typically varies within ranges of about 100:1. Moreover, the frequency response of the thermal sensors used in such flowmeters has a low cutoff frequency, is not linear and may degrade the signal-to-noise ratio, thereby further rendering more difficult the accurate determination of the signal frequency.

It is therefore one object of the present invention to provide a filter circuit for improving the signal-to-noise ratio of fluid flowmeter arrangements.

It is another object of this invention to provide an automatic tracking filter circuit which locks onto the largest signal in a given frequency spectrum.

It is still another object of this invention to provide such a tracking filter capable of low-frequency operation.

It is yet another object of this invention to provide such a tracking filter capable of being tuned over a relatively large range of frequencies.

It is another object of this invention to provide such a tracking filter having a substantially constant Q over its tuning range.

SUMMARY OF THE INVENTION

These and other objects are accomplished in accordance with the invention, an automatic tracking filter comprising a narrow band-pass filter including input and output filter circuits (e.g., a low-pass filter and a high-pass filter) connected in series. The output of the input filter circuit and the input signal itself are coupled to a control circuit which generates an error signal used to tune the filter circuits to the input signal.

In one embodiment, the control circuit includes in separate signal paths a pair of oppositely poled diodes to which the input signal and the output of input filter circuit (e.g., a low-pass filter or a LPF) are respectively connected. These diodes generate rectified positive and negative voltages which give a sense of direction to the generated error signal. The output of the diodes are summed to generate an error signal which is then integrated, amplified and applied to each of the filter circuits to tune each of them to the input signal, thereby bringing the system to equilibrium. The system remains balanced until the signal frequency changes whereupon another error signal is produced and the above operation repeated.

In another embodiment, the control circuit includes a complementary filter connected in parallel with the input filter circuit, i.e., if the input section is a high-pass filter or HPF, then the complementary filter is a LPF. For the purposes of this exposition, therefore, HPF and a LPF shall be termed "complementary" filters. The input signal is coupled into each filter, the outputs of which are designed such that, when each is tuned to the input signal, one leads its input by 90° whereas the other lags its input by 90° and such that the outputs of both are of equal magnitude. The outputs of the input and complementary filter, when added at the same frequency, therefore, produce a null since these outputs are 180° out of phase with one another and are of equal magnitude. When, however, the filters are not tuned to the input signal (i.e., the filter outputs are other than 90° out of phase with the filter inputs) an error signal is produced. Note, however, that the filter outputs are still 180° out of phase with each other. This error signal is integrated, amplified and applied to each of the input and output filter circuits, as well as the complementary filter, to tune each to the input signal.

These automatic tracking filters advantageously have a constant Q over the filter bandwidth which in turn implies a relatively constant signal-to-noise ratio over wide ranges of input signal frequency. Moreover, each is capable of low-frequency operation (e.g., several Hz.) and capable of being tuned over large-frequency ranges (e.g., 30:1 or greater).

BRIEF DESCRIPTION OF THE DRAWING

The above and other objects of the invention, together with its various features and advantages, can be easily understood from the following more detailed discussion, taken in conjunction with the accompanying drawings, in which.

DETAILED DESCRIPTION

Figure 1:
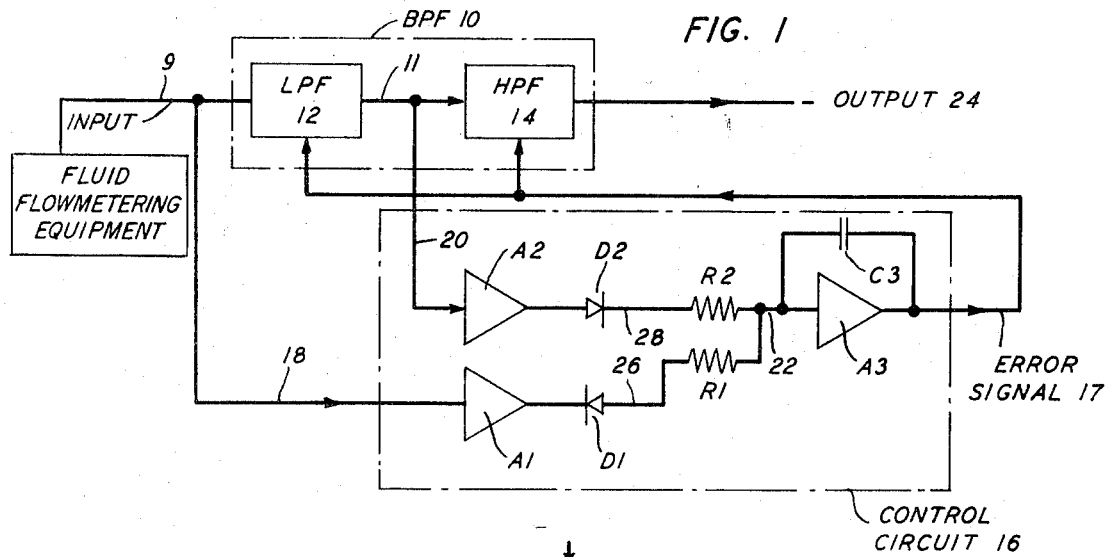
FIG. 1 is a partial schematic, partial block diagrammatic view of one embodiment of the invention.

Turning now to FIG. 1, there is shown in accordance with one embodiment of the present invention amplitude-versus-frequency automatic filter for use in conjunction with fluid flowmetering systems. An electrical analog signal representing flowrate (produced by an appropriate flowmeter including, for example, a bluff body with its related sensors and other equipment) is coupled into the input 9 of a narrow band-pass filter BPF 10 comprising an input, low-pass filter circuit LPF 12 connected in series with an output, high-pass filter circuit HPF 14. The output of the latter is the output 24 of the automatic tracking filter as a whole. It is, of course, apparent that the input circuit could be a HPF and the output circuit tracking LPF. The primary function of BPF 10 is to filter out broad band turbulent noise from the input signal. In order, however, to track the input signal, which may vary in frequency over a range of 100:1 (e.g., 1 Hz. to 100 Hz.), the band-pass filter is connected to a control circuit 16 to generate an error signal 17 which is coupled to both LPF 12 and HPF 14 to tune each filter such that the input signal frequency is within the passband of BPF 10.

The control circuit has two inputs, 18 and 20, one directly from input 9 and the other from the output 11 of LPF 12. The control circuit has only one output, error signal 17. Each of the inputs 18 and 20 is passed through amplifiers A1 and A2, respectively, and then through oppositely poled diodes D1 and D2, respectively. The diode outputs are then scaled by resistors R1 and R2, summed at junction 22 and passed through an integrating circuit formed by operational amplifier A3, resistors R1 and R2 and capacitor C3 connected in parallel with amplifier A3. The output of the integrator is the error signal 17.

Figure 3A:
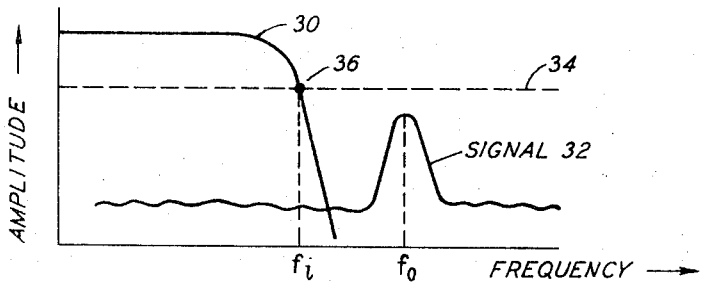
FIGS. 3A and 3B are graphs of amplitude-versus-frequency characteristics of an untuned and tuned, respectively, low-pass filter used in describing the operation of the present invention.

In operation, an input signal 9, having a frequency spectrum illustrated by curve 32 of FIG. 3A, is applied to LPF 12 and amplifier A1. The frequency response of LPF 12 is designated curve 30 in FIG. 3A and the response of amplifiers A1 and A2, not shown, is essentially flat over the frequency range of operation. The output of amplifier A2 is rectified into a positive DC voltage by diode D2, whereas the output of amplifier A1 is rectified into a negative DC voltage by diode D1. The polarity of these two voltages give a sense of direction to the generated error signal in order to tune the filters in either direction. Scaling resistors R1 and R2 are selected such that the output of amplifier A2 has a larger effect on the output of integrator A3 than does the output of A1 (e.g., R1 is greater than R2). This effect is illustrated in FIG. 3A. Curve 30 represents the effect of the signals in path 28 on the integrator output, whereas line 34 represents the effect of the signals in path 26 on the integrator output. The magnitude and polarity of the error signal 17 are determined by the magnitudes of the signals in paths 26 and 28. The system will come to equilibrium when the error signal tunes LPF 12 to the input signal. HPF 14 is tuned simultaneously with LPF 12.

Figure 3B:
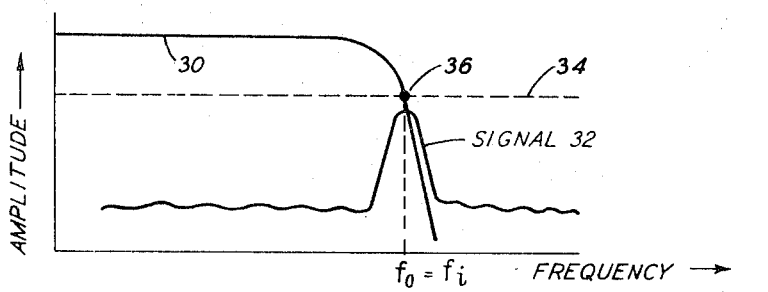

More specifically, as shown illustratively in FIG. 3A, the frequency $f_o$ corresponding to the peak of an exemplary input signal spectrum 32 is greater than the null frequency $f_i$. Consequently, the signal in path 26 will be greater than that in path 28 resulting in a positive error signal being generated by the integrator (the integrator inverts its input). A positive error signal tunes both LPF 12 and HPF 14 in such a direction as to increase their respective cutoff frequencies and causes the system to come to equilibrium as shown in FIG. 3B. That is, the system is balanced when the frequency $f_i$ of intersection point 36 of curve 30 and line 34 coincides with the frequency $f_o$ of the peak input signal amplitude. It can be seen, therefore, that the peak input signal spectrum intersects the skirt of the characteristic of LPF 12. It should be noted, however, that this null point may be shifted slightly since residual noise present in the signal may distort the comparison.

If the frequency $f_o$ were, however, initially less than the cutoff frequency of LPF 12 then the signal in path 28 would be greater than that of the signal in path 26 and consequently a negative error signal 17 would be generated at the integrator output, thereby lowering the cutoff frequency of LPF 12 until, as before, the frequency $f_i$ corresponding to the intersection point 36 coincides with $f_o$.

Figure 4:
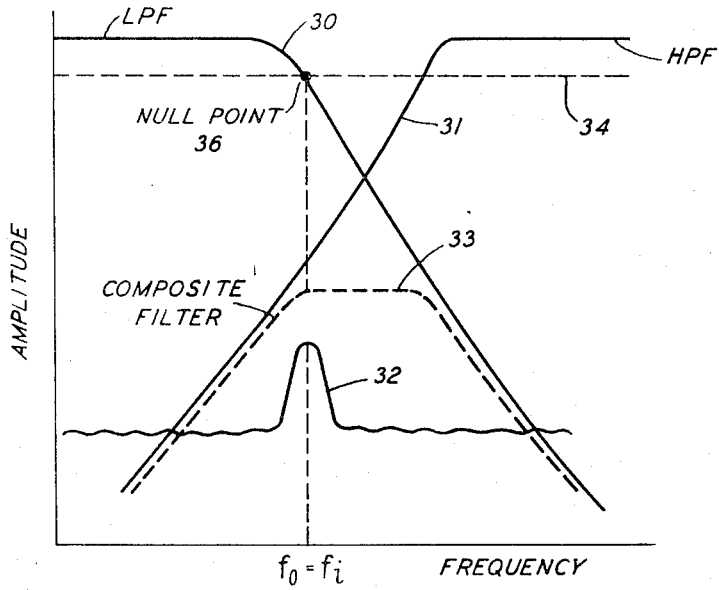
FIG. 4 is a graph of an amplitude-versus-frequency characteristic of low-pass and high-filter circuits, including a composite characteristic of a band-pass filter, used in describing the operation of the embodiment of FIG. 1 of the present invention.

The frequency response characteristics of LPF 12, HPF 14 and the composite band-pass filter are shown in FIG. 4 as curves 30, 31 and 33, respectively. Once again, the null point 36, of the system corresponds to the intersection of curve 30 and line 34. The signal 32 lies within the passband of the composite characteristic 33 at a frequency $f_o=f_i$.

Figure 5:
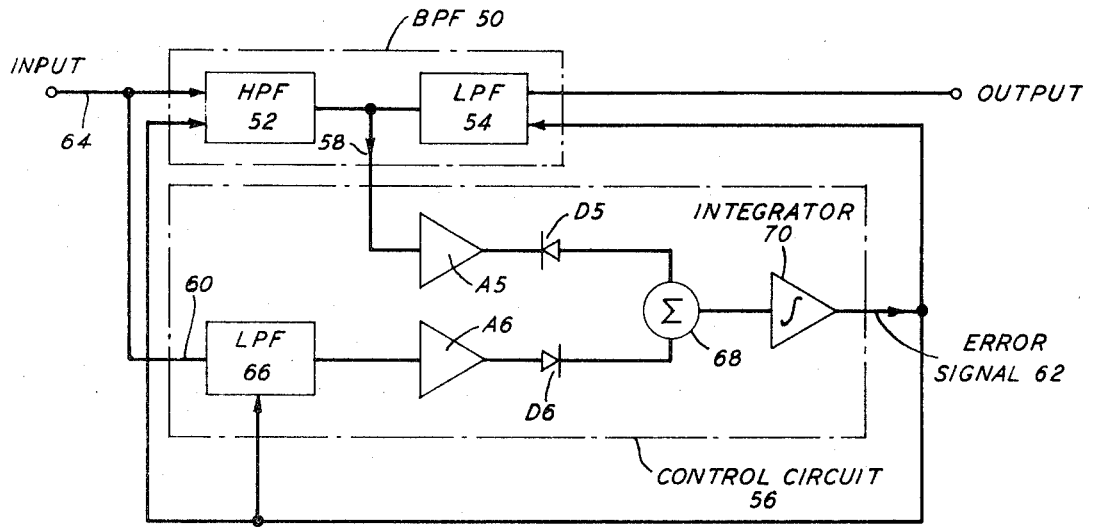
FIG. 5 is a partial schematic, partial block diagrammatic view of another embodiment of the invention.

A second embodiment of an automatic tracking filter in accordance with the present invention is shown in FIG. 5 in which a band-pass filter BPF 50, formed by a high-pass filter HPF 52 connected in series with a low-pass filter LPF 54, is coupled to a control circuit 56 which tunes BPF 50 to the largest signal in a given frequency spectrum. The control circuit has a pair of inputs 58 and 60, one from the input 64 directly and the other from the output of HPF 52, and generates one output, an error signal 62 which is used to tune HPF 52 and LPF 54 to the input signal 64. Included in the control circuit are: a second low-pass filter LPF 66 (connected in parallel with HPF 52); two AC amplifiers A5 and A6 connected, respectively, to the outputs of HPF 52 and LPF 66; oppositely poled diodes D5 and D6 connected, respectively, to the outputs of amplifiers A5 and A6 to polarize the error signal, a summing junction 68 and an integrator 70. Input 58 from the output of HPF 52 is connected directly to amplifier A5 whereas input 60 is passed through LPF 66 and then to amplifier A6. The rectified signals from D5 and D6 are summed at junction 68, the output of which is connected to integrator 70 to generate error signal 62 which is coupled to HPF 52, LPF 54 and LPF 66.

Figure 6:
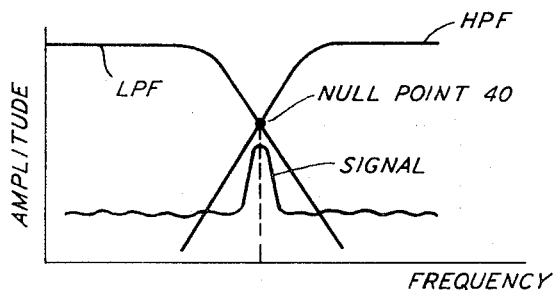
FIG. 6 is a graph of an an characteristic of low- and high-pass filter circuits used in describing the operation of the embodiment of FIG. 5 of the present invention.

In HPF 52 and LPF 66 are designed by means well known in the art such that at a given frequency the output of LPF 66 leads its input by 90°, and at the same frequency the output of HPF 52 lags its input by 90°. The outputs of these filters are compared at summing junction 68 where a null exists provided the inputs thereto at the same frequency are 180° out of phase and equal in magnitude. When the filters, however, are not tuned (i.e., the output of either filter is other than 90° out of phase with its input), then the output of summing junction 68 produces an error signal 62 used to tune HPF 52, LPF 54 and LPF 66 so that the system automatically locks onto the input signal. In this arrangement, as shown in FIG. 6, the filters are tuned such that the frequency of the intersection point 40 of the response characteristics of HPF 52 and LPF 66 coincides with the frequency of the peak amplitude of the input signal.

In a preferred embodiment which applies to the automatic tracking filter of either FIG. 1 or FIG. 5, the filters are two-pole active RC filters utilizing field effect transistors as voltage variable resistors. An illustrative low-pass filter, shown in FIG. 2, comprises a field effect transistor FET 80 having its source electrode S81 connected to input 83 and its drain electrode D82 connected to output 85. An AC feedback arrangement, provided to reduce distortion when large input signals are used, comprises the series combination of resistors R86 and capacitor C87 connected between the source electrode S81 and gate electrode G88, and by a similar combination of R89 and C90 connected between drain D82 and gate G88. Resistor R91 is connected between the source and drain to limit the resistance between the input 83 and the output 85 thereby limiting the low-frequency cutoff of the filter. Finally, the low-pass filter is completed by means of filtering capacitor C92 connected between drain D82 and some point of reference potential such as ground. In a similar high-pass filter arrangement, the FET 80 would be interchanged with capacitor C92. In either case, an error signal 93 is coupled through resistor R93 to the gate G88 to vary the effective resistance between the source and drain and hence the cutoff frequency produced by the RC filter.

Figure 2:
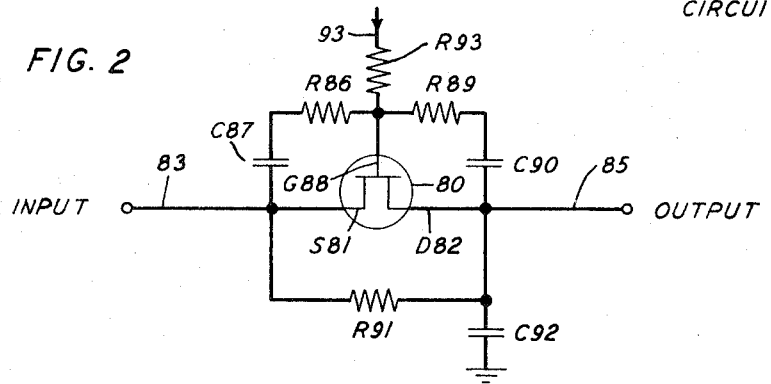
FIG. 2 is a schematic of a low-pass filter for use in accordance with one aspect of the present invention.

The following table lists the approximate values which are appropriate for the components of FIG. 2.

TABLE

| FET 80 | VCR13N |
|---|---|
| R86 | 220 kilohms |
| R89 | 220 kilohms |
| R91 | 15 kilohms |
| R93 | 220 kilohms |
| C87 | 5.6 microfarads |
| C90 | 5.6 microfarads |
| C92 | 5.6 microfarads |

In each embodiment the low-pass and high-pass filters, shown block diagrammatically in FIGS. 1 and 5, typically comprise a pair of such active filters cascaded but separated by buffer stages (e.g., emitter follower transistor circuits) well known in the art to provide isolation. Circuits with the foregoing characteristics have been built and operated to tune to any 100:1 frequency range between 1 Hz. and 400 Hz. Typically the bandlpass covers a range of about 3.5:1 (e.g., 1 to 3.5 Hz. or 10 to 35 Hz.). The signal-to-noise ratio at 50 Hz. and 80 Hz., respectively, was measured to be about 6.5 db. and 9.6 db. Since flowmetering measurements are made on a pulsed basis, the number of pulses missed (or extra pulses counted) was obtained by feeding the outputs from the automatic tracking filter (1–100 Hz.) and a wide band-pass filter (1–120 Hz.) into a Schmitt trigger circuit. The maximum error at 50 Hz. and 80 Hz., respectively, was 6 percent and 8.5 percent for the wide band-pass filter, whereas the maximum error at both these frequencies was only 0.1 percent for the tracking filter.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, other variable resistance elements besides an FET may be utilized in the active filters. For example, thermistors, photoresistors, and varactors could be employed without departing from the spirit and scope of this invention. Moreover, other band-pass filters, such as the modified twin T network disclosed by J. W. Brault in U.S. Pat. No. 3,270,213, could be utilized in combination with the control circuits disclosed herein to produce other automatic tracking filters within the scope of the present invention.

What is claimed is:

1. An automatic tracking filter for locking onto the largest input signal in a given frequency spectrum comprising
   a band-pass filter having an input filter circuit and a complementary output filter circuit coupled thereto, and characterized in that
   control circuit means coupled to said band-pass filter for comparing said input signal with the output of said input filter circuit to generate an error signal,
   said error signal being coupled to each of said input and output filter circuits to tune said circuits to the frequency of said largest signal, the output of said tracking filter being the output of said complementary filter circuit.

2. The tracking filter of claim 1 wherein said input and output filter circuits are connected in series with one another, one of said filter circuits being a low-pass filter and the other being a high-pass filter.

3. The tracking filter of claim 2 wherein said control circuit means comprises
   a first signal path having an input end connected to the output of said input filter circuit and including a first diode,
   a second signal path having an input end adapted to receive directly said input signal and including a second diode oppositely poled to said first diode,
   means for summing the outputs of said first and second signal paths,
   means for integrating said summed outputs to generate said error signal, said error signal being coupled to each of said input and output filter circuits to tune said circuits to said input signal.

4. The tracking filter of claim 3 wherein each of said signal paths includes an amplifier, said diode and a resistor connected in series between said input end thereof and said summing means.

5. The tracking filter of claim 4 for use in conjunction with fluid flowmetering equipment which generates said input signal proportional to the flowrate of said fluid wherein said input filter circuit comprises a low-pass filter, said complementary output filter and said resistors are adapted so that the effect upon said integrating means of the signal in said first signal path is greater than the corresponding effect of the signal in said second signal path,
   said band-pass filter being tuned by said error signal such that the frequency of the peak amplitude of the spectrum of said input signal coincides approximately with the frequency corresponding to the intersection of the frequency response characteristics of said first and second signal paths.

6. The tracking filter of claim 5 wherein said filter circuits each comprise at least one two-pole active RC filter.

7. The tracking filter of claim 6 wherein said RC filter includes a field effect transistor having gate, drain and source electrodes, said gate electrode being adapted to receive said error signal, and a filtering capacitor having one terminal connected to said drain electrode.

8. The tracking filter of claim 7 wherein said RC filter further includes feedback means comprising a first resistor-capacitor series circuit connected between said gate and drain electrodes, a second resistor-capacitor series circuit connected between said gate and source electrodes, and a resistor connected between said drain and source electrodes to limit the lower cutoff frequency of said filter.

9. The tracking filter of claim 8 wherein the resistances of resistors in said first and second series circuits are equal and the capacitances of the capacitors in said first and second series circuits are equal.

10. The tracking filter of claim 8 wherein said RC filter is a low-pass filter, said source electrode is connected to the source of said input signal and said filtering capacitor has its other terminal connected to a point of reference potential.

11. The tracking filter of claim 8 wherein said RC filter is a high-pass filter, said filtering capacitor has its other terminal connected to the source of said input signal and said source electrode is connected to a point of reference potential.

12. The tracking filter of claim 2 for use in conjunction with fluid flowmetering equipment which generates said input signal proportional to the flowrate of said fluid wherein said control circuit means comprises,
   a second complementary filter circuit connected in parallel with said input filter circuit, said input signal being coupled to each of said circuits,
   one of said input and second complementary filter circuits being adapted so that its output leads its input by 90° when tuned to said input signal, and the other of said circuits being adapted so that its output lags its input by 90° when tuned to said input signal,
   means for rectifying said latter outputs to generate signals of opposite polarity,
   means for summing said signals of opposite polarity,
   means for integrating said summed signals to generate an error signal, said error signal being coupled to each of said input, complementary output and second complementary filter circuits to tune said filters to the frequency of the peak amplitude of the spectrum of said input signal.

13. The tracking filter of claim 12 wherein said input filter circuit comprises a high-pass filter, and said complementary filters each comprise a low-pass filter.

14. The tracking filter of claim 13 wherein each of said filter circuits comprises at least one two-pole active RC filter.

15. The tracking filter of claim 14 wherein said RC filter includes a field effect transistor having gate, drain and source electrodes, said gate electrode being adapted to receive said error signal, and a filtering capacitor having one terminal connected to said drain electrode.

16. The tracking filter of claim 15 wherein said RC filter further includes feedback means comprising a first resistor-capacitor series circuit connected between said gate and drain electrodes, a second resistor-capacitor series circuit connected between said gate and source electrodes, and a resistor connected between said drain and source electrodes to limit the lower cutoff frequency of said filter.

17. The tracking filter of claim 16 wherein the resistances of said resistors in said first and second series circuits are equal and the capacitances of the capacitors in said first and second series circuits are equal.

18. The tracking filter of claim 16 wherein said RC filter is a low-pass filter, said source electrode is connected to the source of said input signal and said filtering capacitor has its other terminal connected to a point of reference potential.

19. The tracking filter of claim 16 wherein said RC filter is a high-pass filter and said filtering capacitor has its other terminal connected to the source of said input signal and said source electrode is connected to a point of reference potential.

* * * * *